United States Patent
Jhang et al.

(10) Patent No.: US 12,211,214 B2
(45) Date of Patent: Jan. 28, 2025

(54) IMAGE PROCESSING CIRCUIT AND IMAGE PROCESSING METHOD FOR BLURRING AN IMAGE

(71) Applicant: SigmaStar Technology Ltd., Fuijan (CN)

(72) Inventors: Jia-Tse Jhang, Zhubei (TW); Yu-Hsiang Lin, Zhubei (TW); Chia-Jen Mo, Zhubei (TW); Lin-Chung Tsai, Zhubei (TW)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 357 days.

(21) Appl. No.: 17/726,882

(22) Filed: Apr. 22, 2022

(65) Prior Publication Data
US 2023/0070778 A1    Mar. 9, 2023

Related U.S. Application Data (60) Provisional application No. 63/242,471, filed on Sep. 9, 2021.

(51) Int. Cl.
*G06T 7/194* (2017.01)
*G06T 5/20* (2006.01)
(Continued)

(52) U.S. Cl.
CPC ............... *G06T 7/194* (2017.01); *G06T 5/20* (2013.01); *G06T 5/94* (2024.01); *G06T 7/12* (2017.01);
(Continued)

(58) Field of Classification Search
CPC .. G06T 7/194; G06T 5/20; G06T 5/94; G06T 7/12; G06T 2207/20024; G06T 2207/20084; G06T 5/60; G06T 5/50; G06T 2207/10016; G06T 2207/20016; G06T 2207/20081; G06T 2207/20221;
(Continued)

(56) References Cited

U.S. PATENT DOCUMENTS 7,881,550 B2 * 2/2011 Ito ..................... H04N 5/142
                                                348/625
7,894,684 B2 * 2/2011 Monobe ............... G06T 5/94
                                                348/625

(Continued)

OTHER PUBLICATIONS

Waris et al, CNN-base d edge filtering for object proposals, Neurocomputing 266 (2017) 631-640 (Year: 2017).*
(Continued)

*Primary Examiner* — Andrae S Allison
(74) *Attorney, Agent, or Firm* — Edell, Shapiro & Finnan, LLC (57) ABSTRACT

The present disclosure provides an image processing circuit including a neural network processor, a background processing circuit and a blending circuit. The neural network processor is configured to process input image data to determine whether the input image data has a predetermined object so as to generate to heat map. The background processing circuit blurs the input image data to generate blurred image data. The blending circuit blends the input image data and the blurred image data according to the heat map to generate output image data.

13 Claims, 6 Drawing Sheets

(51) Int. Cl.
*G06T 5/94* (2024.01)
*G06T 7/12* (2017.01)

(52) U.S. Cl.
CPC ............... *G06T 2207/20024* (2013.01); *G06T 2207/20084* (2013.01)

(58) Field of Classification Search
CPC ... G06T 2207/30196; G06T 1/20; G06T 5/70; G06T 3/40; G06T 7/13; G06N 3/045
See application file for complete search history.

(56) References Cited

U.S. PATENT DOCUMENTS

| | | | | |
|---|---|---|---|---|
| 8,406,559 | B2* | 3/2013 | Wu | G06T 5/73 |
| | | | | 382/274 |
| 8,472,724 | B2* | 6/2013 | Lertrattanapanich | G06T 5/70 |
| | | | | 382/266 |
| 11,379,956 | B2* | 7/2022 | Huang | G06T 5/73 |
| 2009/0097775 | A1* | 4/2009 | Monobe | G06T 5/94 |
| | | | | 382/268 |
| 2010/0066868 | A1* | 3/2010 | Shohara | G06T 5/20 |
| | | | | 348/241 |
| 2010/0188523 | A1* | 7/2010 | Ito | H04N 5/142 |
| | | | | 348/222.1 |
| 2011/0116726 | A1* | 5/2011 | Hosaka | G06T 5/73 |
| | | | | 382/255 |
| 2017/0024852 | A1* | 1/2017 | Oztireli | G06T 5/50 |
| 2020/0043135 | A1* | 2/2020 | Chou | G06T 1/20 |
| 2020/0265567 | A1* | 8/2020 | Hu | G06T 5/50 |

OTHER PUBLICATIONS

Menikdiwela, Medhani, et al. "CNN-based small object detection and visualization with feature activation mapping." 2017 international conference on image and vision computing New Zealand (IVCNZ). IEEE, 2017. (Year: 2017).*

Min et al, Edge Map-guided Scale-iterative Image Deblurring, Proceedings, APSIPA Annual Summit and Conference 2021 (Year: 2021).*

* cited by examiner

IMAGE PROCESSING CIRCUIT AND IMAGE PROCESSING METHOD FOR BLURRING AN IMAGE

This application claims the benefit of U.S. Provisional Ser. No. 63/242,471, filed on Sep. 9, 2021, the subject matter of which is incorporated herein by reference.

BACKGROUND OF THE INVENTION

Field of the Invention

The present disclosure relates to an image processing circuit and an image processing method that partially blur a background of image data.

Description of the Related Art

Among current electronic apparatuses having an image capturing function, some electronic apparatuses have a background blur function so as to partially blur the background of a captured image. For example, during a video conference, an electronic apparatus may initiatively analyze image data captured by a camera so as to identify the location of an individual for such background blur to provide user privacy protection. However, the background blur may result display flaws at foreground edges due to foreground identification issues, such that video quality may be degraded.

SUMMARY OF THE INVENTION

Therefore, it is an object of the present disclosure to provide an image processing method, which generates a heat map by a neural network processor and then blends an original image and a blurred image according to the heat map so as to generate a background blurred image.

An image processing circuit disclosed according to one embodiment of the present disclosure includes a neural network processor, a background processing circuit and a blending circuit. The neural network processor processes input image data to determine whether the input image data has a predetermined object so as to generate to heat map. The background processing circuit blurs the input image data to generate blurred image data. The blending circuit blends the input image data and the blurred image data according to the heat map to generate output image data.

An image processing method disclosed according to one embodiment of the present disclosure includes processing input image data by a neural network processor to determine whether the input image data has a predetermined object so as to generate to heat map, blurring the input image data to generate blurred image data, and blending the input image data and the blurred image data according to the heat map to generate output image data.

With the foregoing embodiments of the present disclosure, using precise identification capabilities of a neural network processor and a background processing circuit having a simple structure, a background can be quickly and effectively blurred while clarity of a foreground is maintained, and foreground edges of the background blurred image can also appear smoother.

DETAILED DESCRIPTION OF THE INVENTION

Figure 1:
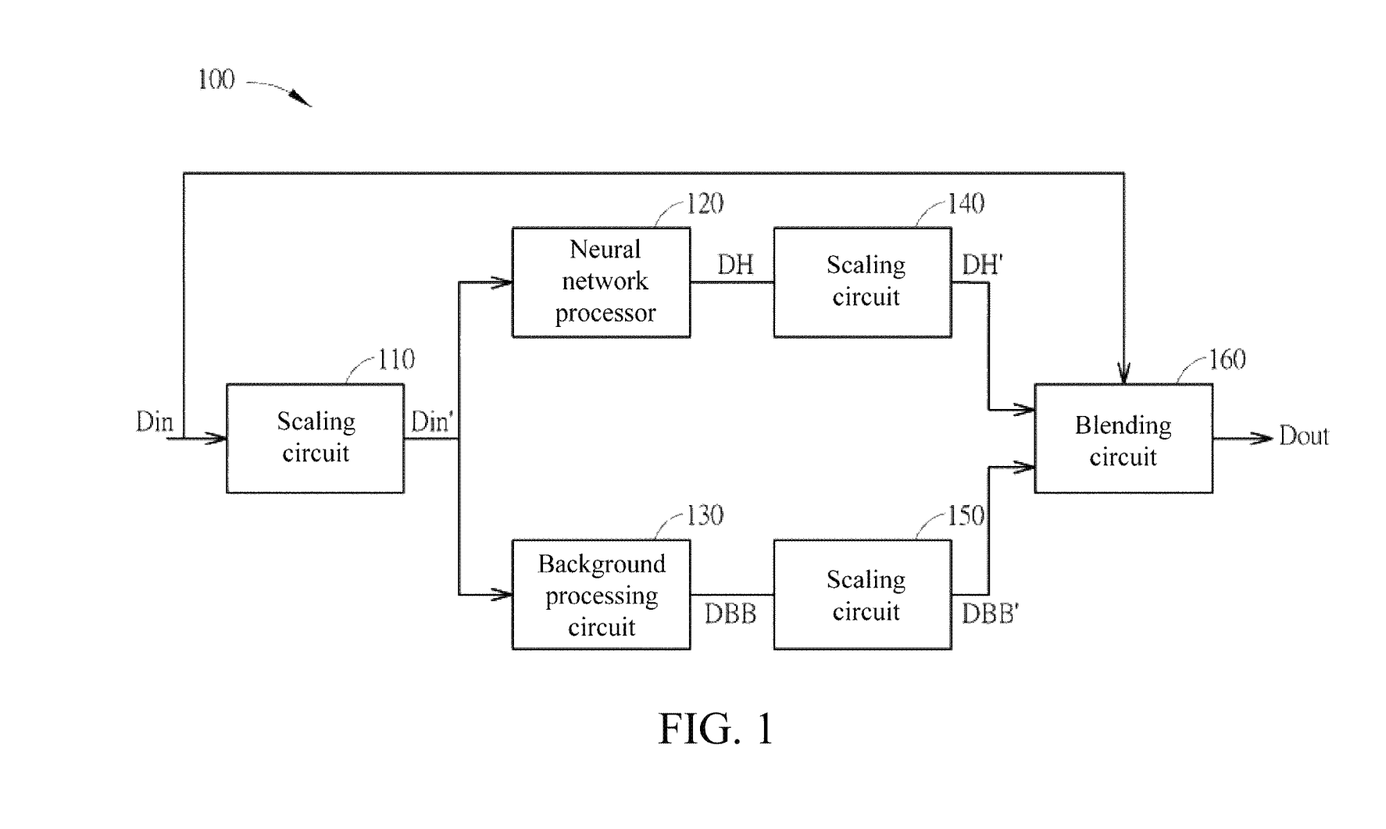
FIG. 1 is a schematic diagram of an image processing circuit according to an embodiment of the present disclosure.

FIG. 1 shows a schematic diagram of an image processing circuit 100 according to an embodiment of the present disclosure. As shown in FIG. 1, the image processing circuit 100 includes a scaling circuit 110, a neural network processor 120, a background processing circuit 130, scaling circuits 140 and 150, and a blending circuit 160. In this embodiment, the image processing circuit 100 is suitable for any image capturing device or image display device such as a camera, a smart phone, a tablet computer and a laptop computer. That is, the image processing circuit 100 can receive input image data Din from an image sensor or generated by an image source so as to generate output image data Dout, which may be displayed on a display panel.

In an operation of the image processing circuit 100, the scaling circuit 110 downscales the input image data Din to generate downscaled input image data Din'. For example, assuming that the input image data Din includes frames having a resolution of 1920*1080 and the scaling circuit 110 can reduce the resolution of the input image data Din, the downscaled input image data Din' then includes frames having a lower resolution so as to decrease the amount of data to be processed subsequently. Then, the neural network processor 120 performs image identification on the downscaled input image data Din' to determine whether each frame in the downscaled input image data Din' has a predetermined object so as to generate a heat map. In this embodiment, the predetermined object is a person, and the following description is given on this basis.

Figure 2:
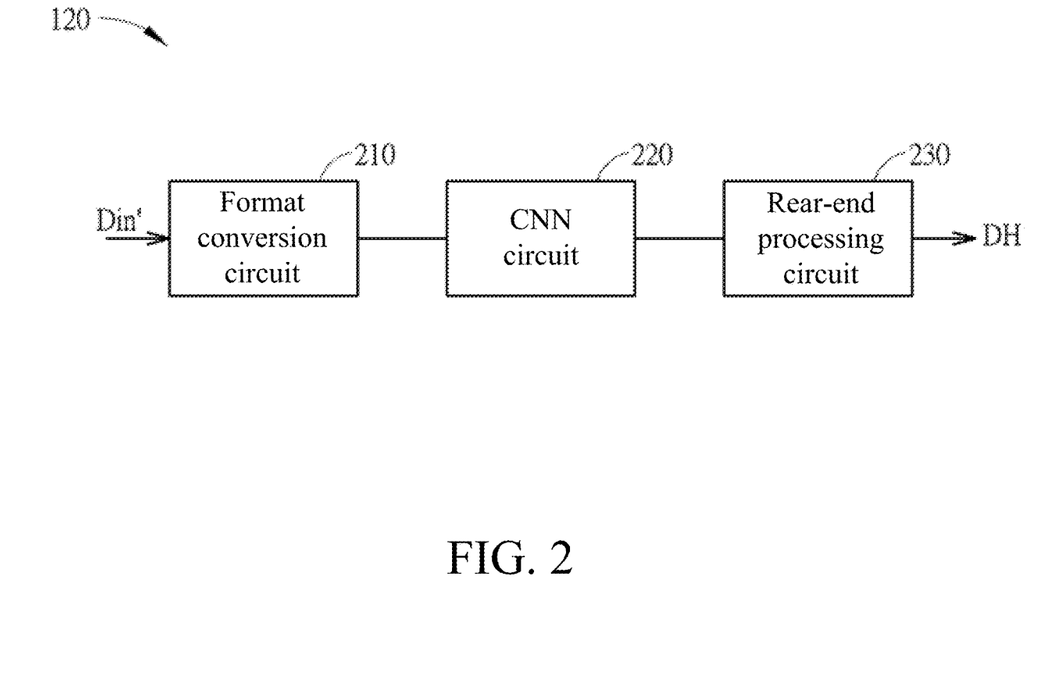
FIG. 2 is a schematic diagram of a neural network processor according to an embodiment of the present disclosure.

In one embodiment, as shown in FIG. 2, the neural network processor 120 includes a format conversion circuit 210, a convolutional neural network (CNN) circuit 220 and a rear-end processing circuit 220. In an operation of the neural network processor 120, the format conversion circuit 210 performs format conversion on the downscaled input image data Din' to meet a requirement of the neural network processor 120, for example, converting an original NV12 format to an RGB format. The convolutional neural network circuit 220 performs feature extraction and identification on the downscaled input image data Din' to identify the position(s) and edges of one or more persons in the downscaled input image data Din' and to accordingly generate one or more feature maps. In one embodiment, the convolutional neural network circuit 220 generates a person feature map and an edge feature map. The rear-end processing circuit 230 fuses and converts the one or more feature maps generated by the convolutional neural network circuit 220 to generate a heat map DH, which indicates an area including one or more persons in the downscaled input image data Din'. For example, the heat map DH and the downscaled input image data Din' may have the same resolution; an area containing one or more persons in the downscaled input image data has a higher value (for example 255) in the corresponding heat map DH, and the remaining area in the downscaled input image data Din' has a lower value (for example, 0) in the corresponding heat map DH.

Figure 3:
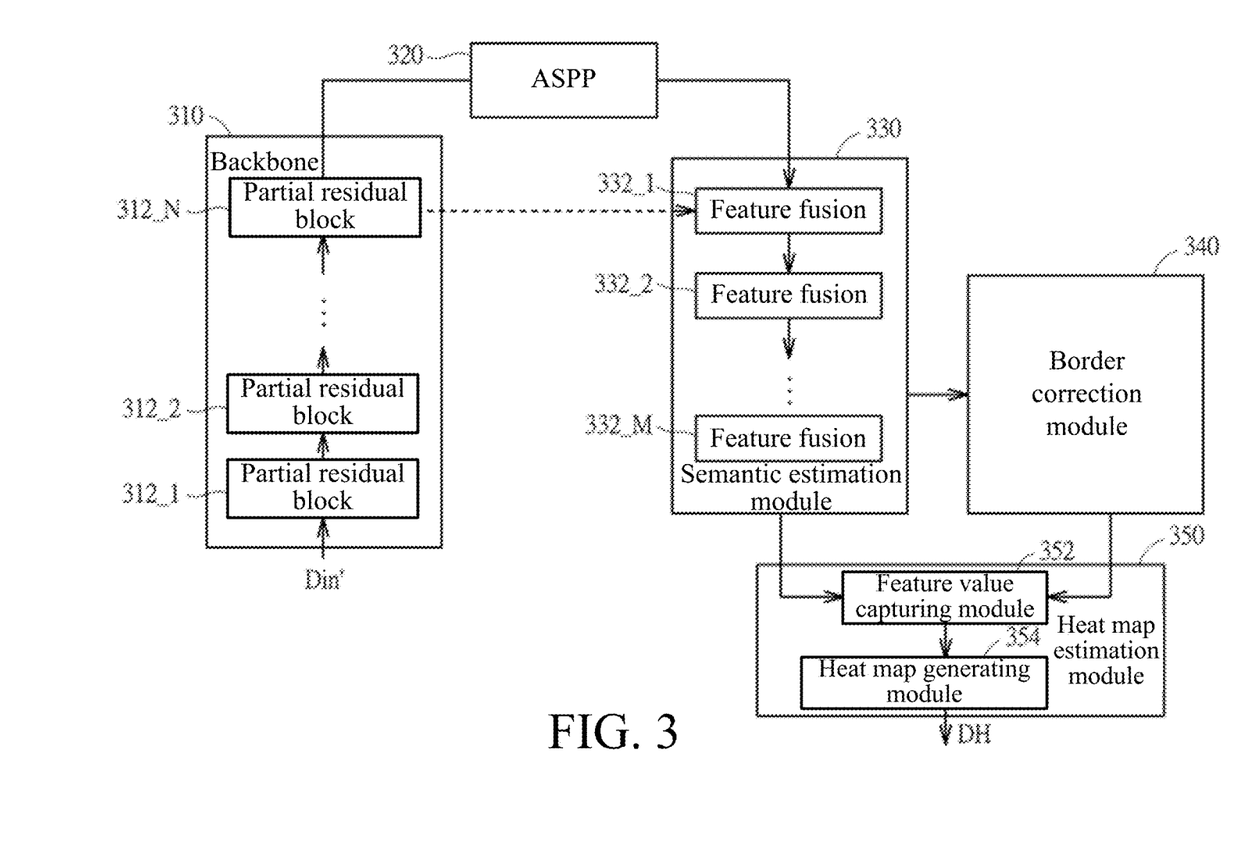
FIG. 3 is a schematic diagram of operations of a convolutional neural network circuit and a rear-end processing circuit in a neural network processor according to an embodiment of the present disclosure.

In one embodiment, refer to FIG. 3 showing operations of the convolutional neural network circuit 220 and the rear-end processing circuit 230. As shown in FIG. 3, the downscaled input image data Din' may first undergo operations of different convolution layers corresponding to multiple partial residual blocks 312_1 to 312_N in a backbone 310 to generate corresponding feature values, and an atrous spatial pyramid pooling (ASPP) 320 then receives the feature value generated from the backbone 310 so as to reduce dimensions of the feature maps and reinforce the feature values. Next, a semantic estimation module 330 performs multiple feature fusions 332_1 to 332_M on the feature values from the backbone 310 and the ASPP 320 to generate a person feature map. A border correction module 340 performs edge identification on the person feature map to generate an edge feature map. Lastly, a feature value capturing module 352 in a heat map estimation module 350 captures an output feature map according to the person feature map and/or the edge feature map, and a heat map generating module 354 then generates the heat map DH according to the output feature map. In one embodiment, the backbone 310, the ASPP 320, the semantic estimation module 330 and the border correction module 340 may be implemented by the convolutional neural network circuit 220 or be included in the convolutional neural network circuit 220, and the heat map estimation map 350 may be implemented by the rear-end processing circuit 230 or be included in the rear-end processing circuit 230. In one embodiment, the rear-end processing circuit 230 is also implemented by a convolutional neural network circuit, or may be integrated in the convolutional neural network circuit 220.

Referring to FIG. 3 showing the schematic diagram of operations, the process of generating the heat map DH by the neural network processor 120 may be further divided into three parts—first generating the person feature map according to the downscaled input image data Din', then generating the edge feature map according to the person feature map, and lastly generating the heat map DH according to the person feature map and the edge feature map. By dividing and the process of generating the heat map DH into three parts processing accordingly, the accuracy for person and edge identification can be improved and the processing complexity of the neural network processor 120 can be reduced. In practice, the neural network processor 120 may performing training with respect to the three parts above; that is, providing a reference person feature map for the neural network processor 120 to learn and identify persons and generate the person feature map, providing a reference edge feature map for the neural network processor 120 to learn and identify edges from the person feature map so as to generate the edge feature map, and providing a reference heat map for the neural network processor 120 to learn and use the person feature map and the edge feature map to generate the heat map DH.

Figure 4:
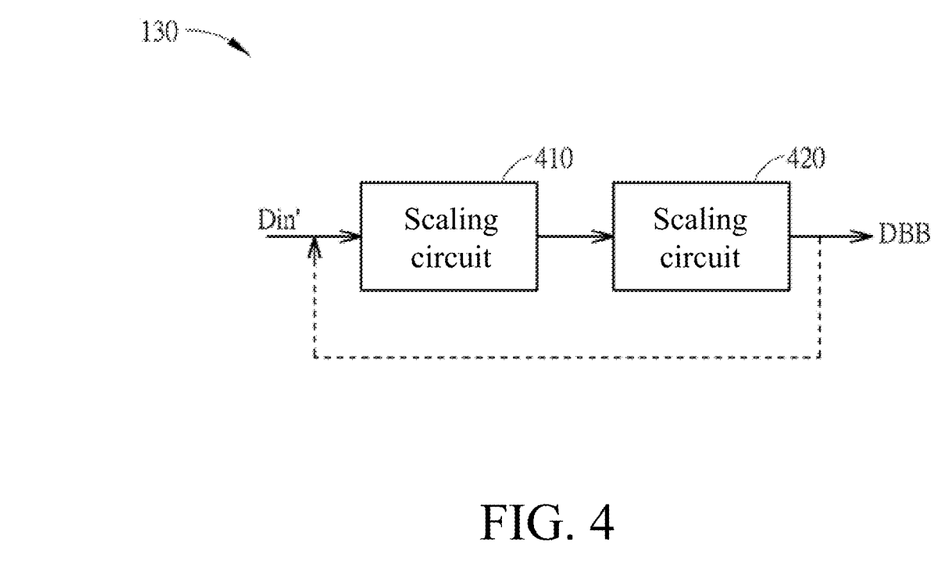
FIG. 4 is a schematic diagram of a background processing circuit according to an embodiment of the present disclosure.

The background processing circuit 130 blurs the downscaled input image data Din' to generate blurred image data DBB. In one embodiment, the background processing circuit 130 may perform low-pass filtering on each pixel in the downscaled input image data Din', that is, performing weighted addition on each pixel and multiple surrounding pixels to obtain a filtered pixel value of the pixel. In one embodiment, the low-pass filtering above may be performed via a Gaussian filter matrix. In another embodiment, as shown in FIG. 4, the background processing circuit 130 may include two scaling circuits 410 and 420. The scaling circuit 410 may downscale the downscaled input image data Din', and the scaling circuit 420 may perform upscaling to generate the blurred image data DBB. In one embodiment, the scaling circuits 410 and 420 may operate for multiple times to generate the blurred image data DBB, that is, the blurred image data DBB may be again input to the scaling circuit 410 for scaling of a next round to generate a next set of blurred image data DBB for output of the background processing circuit 130. In this embodiment, the background processing circuit 130 directly blurs the entire of the downscaled input image data Din' instead of selectively blurring a partial area of the downscaled input image data Din'. More specifically, for each frame in the downscaled input image data Din', the background processing circuit 130 directly blurs the entire frame. Since the same processing is performed on the entire frame, the background processing circuit 130 may be implemented by a simple structure, hence achieving the image blur function without involving a complex circuit structure and/or design.

Next, the scaling circuit 140 upscales the heat map DH to generate a scaled heat map DH', wherein a resolution of the heat map DH' is greater than that of the heat map DH. In one embodiment, the resolution of the scaled heat map DH' is equal to the resolution of the input image data Din; for example, the resolutions of the scaled heat map DH' and the resolution of the input image data Din are both 1920*1080. Similarly, the scaling circuit 150 upscales the blurred image data DBB to generate scaled blurred image data DBB'. In one embodiment, the resolution of the scaled blurred image data DBB' is equal to the resolution of the input image data Din; for example, the resolutions of the scaled blurred image data DBB' and the resolution of the input image data Din are both 1920*1080.

In the operation of the blending circuit 160, the blending circuit 160 blends the input image data Din and the scaled blurred image data DBB' according to the scaled heat map DH', for example, performing weighted addition, to generate output image data Dout, wherein the scaled heat map DH' serves as a weight basis for the blending. For example, because the input image data Din, the scaled heat map DH' and the scaled blurred image data DBB' have the same resolution, for pixels at the same position, a pixel value Pout of a pixel of the output image data Dout may be calculated as below:

$$Pout=Pin*(PH/255)+PBB*((255-PH)/255) \qquad (1)$$

where Pin is the pixel value of the input image data Din, PH is the pixel value of the scaled heat map DH', and PBB is the pixel value of the scaled blurred image data DBB'. In an example, assuming that the pixel currently being processed is within an area of a person, PH is then a very high value, for example, PH is "255", and so the pixel value Pout of the output image data Dout calculated according to equation (1) above is the pixel value Pin of the input image data Din. In another example, assuming that the pixel currently being processed is outside an area of a person (for example, an area of the background), PH is then a very low value, for example, PH is "0", and so the pixel value Pout of the output image data Dout calculated according to equation (1) above is the pixel value PBB of the blurred image data DBB'.

In one embodiment, the blending performed by the blending circuit 160 on the input image data Din and the scaled blurred image data DBB' selects and outputs one between the pixel values of the respective corresponding pixels of the input image data Din and the scaled blurred image data DBB' in a pixel-by-pixel manner according to the scaled heat map DH', as the pixel value of the corresponding pixel of the output image data Dout. For example, the pixel value of the scaled heat map DH' may be 255 or 0. When the pixel value of a pixel is "255", it means that the pixel is located within an area of a person; when the pixel value of a pixel is "0", it means that the pixel is not located within an area of a person. In this embodiment, when the pixel value of the pixel currently being processed in the scaled heat map DH is "255", the blending circuit 160 selects and outputs the pixel value of the corresponding pixel in the input data image Din as the pixel value of the corresponding pixel in the output image data Dout; when the pixel value of the pixel currently being processed in the scaled heat map DH' is "0", the blending circuit 160 selects and outputs the pixel value of the corresponding pixel in the scaled blurred image data DBB' as the pixel value of the corresponding pixel in the output image data Dout.

Figure 5:
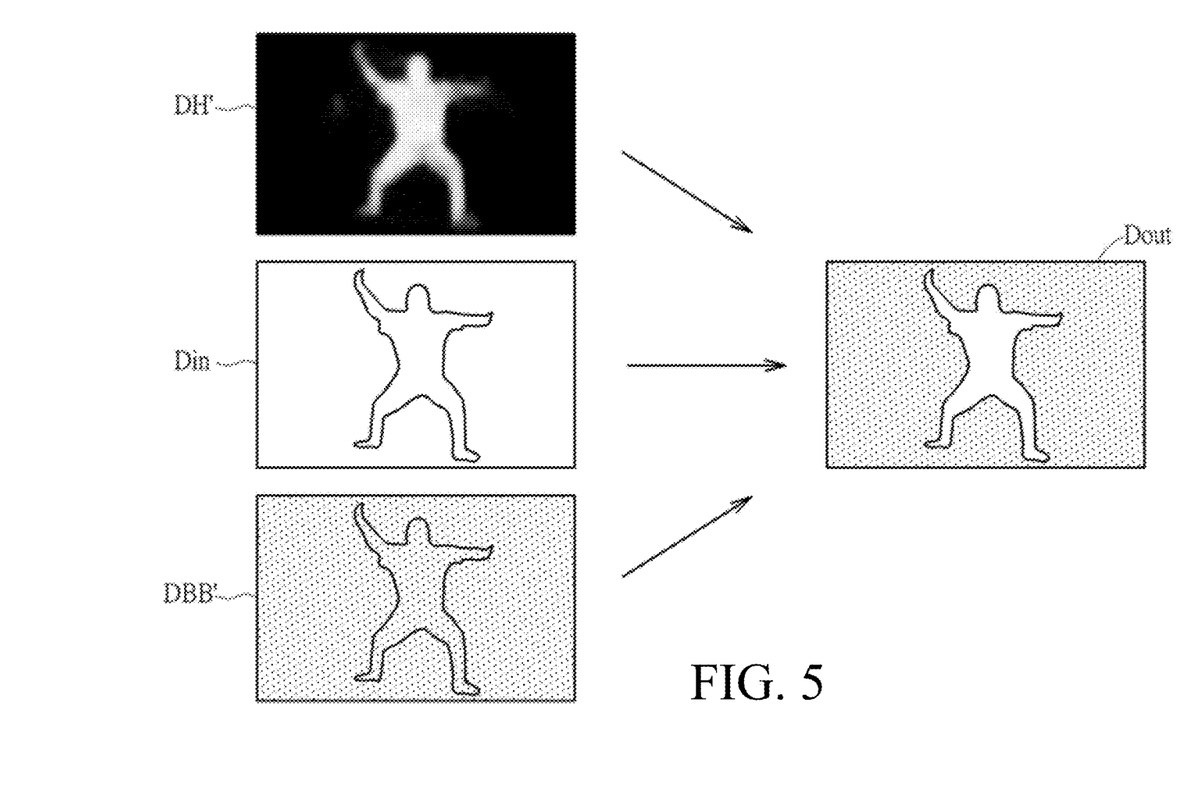
FIG. 5 is a schematic diagram of input image data, a scaled heat map, scaled blurred image data and output image data according to an embodiment of the present disclosure.

FIG. 5 shows a schematic diagram of the input image data Din, the scaled heat map DH', the scaled blurred image data DBB' and the output image data Dout. As shown in FIG. 5, with the processing of the image processing circuit 100, the background can be quickly ad effectively blurred while the clarity of the foreground (person) is maintained.

It should be noted that, in the embodiments in FIG. 1 to FIG. 5, the input image data Din is first processed by the scaling circuit 110 to generate the downscaled input imaged data Din' that then enters the neural network processor 120 and the background processing circuit 130 for subsequent processing, so as to reduce the overall circuit computation amount. However, this feature is not construed to be a limitation of the present disclosure. In other embodiments, the neural network processor 120 and the background processing circuit 130 may directly process the input image data Din. At this point, the scaling circuits 110, 140 and 150 may be eliminated from the image processing circuit 100, and the blending circuit 160 then directly blends the input image data Din and the blurred image data DBB according to the heat map DH to generate the output image data Dout. In one embodiment, provided with a circuit processing speed that is fast enough, the scaling circuit 140 and the scaling circuit 150 may be implemented by the same circuit.

Figure 6:
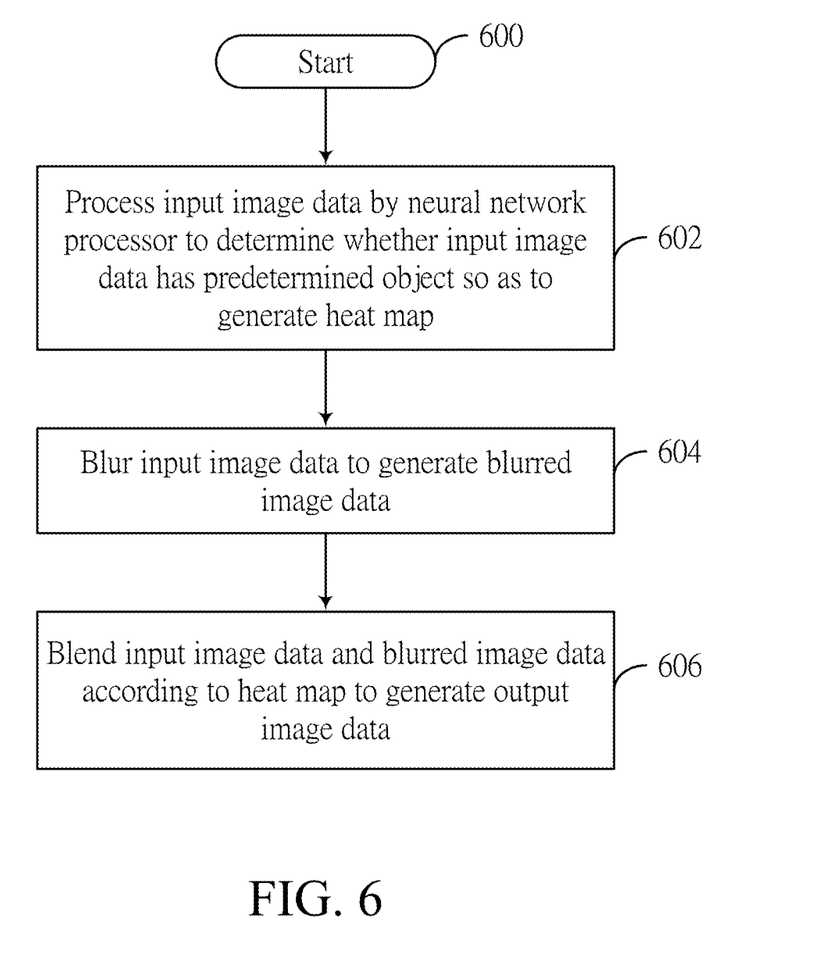
FIG. 6 is a flowchart of an image processing method according to an embodiment of the present disclosure.

FIG. 6 shows a flowchart of an image processing method according to an embodiment of the present disclosure. The image processing method of the present disclosure is applicable to an image processing device. With reference to the details of the embodiments above, the process of the image processing method is as below.

In step 600, the process begins.

In step 602, input image data is processed by a neural network processor to determine whether the input image data has a predetermined object so as to generate to a heat map.

In step 604, the input image data is blurred to generate blurred image data.

In step 606, the input image data and the blurred image data are blended according to the heat map to generate output image data.

Summarizing the present disclosure, in the image processing circuit and the image processing method of the present disclosure, an original image is analyzed by a neural network processor to generate a heat map, the original image is blurred to generate a blurred image, and the original image and the blurred image are blended according to the heat map to generate a background blurred image as output image data. In the present disclosure, using precise identification capabilities of a neural network processor and a background processing circuit having a simple structure, a background can be quickly and effectively blurred while clarity of a foreground is maintained without involving an additional sensor (for example, a distance sensor) or selectively blurring an image frame by a complicated circuit, and foreground edges of the background blurred image can also appear smoother.

The description above provides merely preferred embodiments of the present disclosure, and all variations and modifications made based on the range of claims of the present invention are to be encompassed within the scope of the present disclosure.

What is claimed is:

1. An image processing circuit, comprising:
   a neural network processor, configured to process input image data to determine whether the input image data has a predetermined object so as to generate to heat map;
   a background processing circuit, configured to blur the input image data to generate blurred image data; and
   a blending circuit, configured to blend the input image data and the blurred image data according to the heat map to generate output image data,
   wherein the blending circuit performs weighted addition on the input image data and the blurred image data to generate the output image data, wherein a weight used in the weighted addition is generated according to the heat map.

2. The image processing circuit of claim 1, wherein the background processing circuit blurs an entire of the input image data to generate the blurred image data.

3. The image processing circuit of claim 1, wherein the neural network processor comprises:
   a convolutional neural network circuit, configured to perform feature extraction and identification on the input image data to identify a position of the predetermined object so as to generate an object feature map, and performing edge identification on the object feature map to generate an edge feature map; and
   a rear-end processing circuit, configured to generate the heat map according to the object feature map and the edge feature map.

4. The image processing circuit of claim 1, wherein the neural network processor performs object identification on the input image data to generate an object feature map, performs edge identification on the object feature map to generate an edge feature map, and generates the heat map according to the object feature map and the edge feature map.

5. The image processing circuit of claim 1, wherein the background processing circuit performs low-pass filtering on each pixel in the input image data to generate the blurred image data.

6. The image processing circuit of claim 1, wherein the background processing circuit downscales and upscales the input image data for at least one round to generate the blurred image data.

7. The image processing circuit of claim 1, wherein the blending circuit selects and outputs one between pixel values of respective corresponding pixels of the input image data and the blurred image data in a pixel-by-pixel manner according to the heat map, as a pixel value of a corresponding pixel of the output image data.

8. An image processing circuit comprising:
a neural network processor. configured to process input image data to determine whether the input image data has a predetermined object so as to generate to heat map;
a background processing circuit, configured to blur the input image data to generate blurred image data;
a blending circuit, configured to blend the input image data and the blurred image data according to the heat map to generate output image data; and
a first scaling circuit, configured to downscale the input image data to generate downscaled input image data;
wherein the neural network processor processes the downscaled input image data to determine whether the downscaled input image data has the predetermined object so as to generate the heat map, and the background processing circuit blurs the downscaled input image data to generate the blurred image data.

9. The image processing circuit of claim 8, further comprising:
a second scaling circuit, configured to upscale the heat map to generate a scaled heat map; and
a third scaling circuit, configured to upscale the blurred image data to generate scaled blurred image data;
wherein, the blending circuit blends the input image data and the scaled blurred image data according to the heat map to generate the output image data.

10. An image processing method, applied to an image processing device, the method comprising:
processing input image data by a neural network processor to determine whether the input image data has a predetermined object so as to generate to heat map;
blurring the input image data to generate blurred image data; and
blending the input image data and the blurred image data according to the heat map to generate output image data,
wherein the blending of the input image data and the blurred image data according to the heat map performs weighted addition on the input image data and the blurred image data to generate the output image data, wherein a weight used in the weighted addition is generated according to the heat map.

11. The image processing method of claim 10, wherein the blurring of the input image data blurs an entire of the input image data to generate the blurred image data.

12. The image processing method of claim 10, wherein the neural network processor performs object identification on the input image data to generate an object feature map, performs edge identification on the object feature map to generate an edge feature map, and generates the heat map according to the object feature map and the edge feature map.

13. The image processing method of claim 10, wherein the blending of the input image data and the blurred image data according to the heat map selects and outputs one between pixel values of respective corresponding pixels of the input image data and the blurred image data in a pixel-by-pixel manner according to the heat map, as a pixel value of a corresponding pixel of the output image data.

* * * * *